US012673306B2

(12) United States Patent
Wang et al.

(10) Patent No.: US 12,673,306 B2
(45) Date of Patent: Jul. 7, 2026

(54) PULPING MACHINE

(71) Applicant: ONGOAL TECHNOLOGY CO., LTD., Dongguan (CN)

(72) Inventors: Xie Wang, Dongguan (CN); Hailun Yang, Dongguan (CN); Chao Yuan, Dongguan (CN); Xiaobing Dai, Dongguan (CN); Jie He, Dongguan (CN)

(73) Assignee: ONGOAL TECHNOLOGY CO., LTD., Dongguan (CN)

( * ) Notice: Subject to any disclaimer, the term of this patent is extended or adjusted under 35 U.S.C. 154(b) by 305 days.

(21) Appl. No.: 18/502,441

(22) Filed: Nov. 6, 2023

(65) Prior Publication Data

US 2024/0066477 A1 Feb. 29, 2024

Related U.S. Application Data

(63) Continuation of application No. PCT/CN2023/077010, filed on Feb. 18, 2023.

(30) Foreign Application Priority Data

Aug. 16, 2022 (CN) ........................ 202222162200.X

(51) Int. Cl.
*B01F 23/50* (2022.01)
*B01F 23/53* (2022.01)
(Continued)

(52) U.S. Cl.
CPC ............ *B01F 23/59* (2022.01); *B01F 23/511* (2022.01); *B01F 23/708* (2022.01); *B01F 23/71* (2022.01); *B01F 27/0724* (2022.01)

(58) Field of Classification Search
CPC .... B02C 13/1814; B01F 23/59; B01F 23/511; B01F 23/08; B01F 23/71; B01F 23/53; B01F 27/0724; B01F 27/2721
See application file for complete search history.

(56) References Cited

U.S. PATENT DOCUMENTS

| | | | | |
|---|---|---|---|---|
| 10,864,495 | B1 | 12/2020 | Zucca et al. | |
| 2005/0286343 | A1* | 12/2005 | Boutet | B01F 25/4521 366/303 |
| 2006/0268657 | A1 | 11/2006 | Schertenleib | |

FOREIGN PATENT DOCUMENTS

| | | | |
|---|---|---|---|
| CN | 1714920 | A | 1/2006 |
| CN | 203963389 | U | 11/2014 |

(Continued)

OTHER PUBLICATIONS

English translate (CN113499698A), retrieved date Oct. 23, 2025.*
(Continued)

*Primary Examiner* — Mohammed S. Alawadi
(74) *Attorney, Agent, or Firm* — Westbridge IP LLC

(57) ABSTRACT

A pulping machine includes a frame, a mixing device, and a dispersing device. The frame has a mixing chamber and a dispersing chamber, the mixing device is accommodated in the mixing chamber, the dispersing device is accommodated in the dispersing chamber; the dispersing chamber has a liquid inlet, the mixing chamber has a liquid outlet, the liquid inlet, the dispersing chamber, the mixing chamber and the liquid outlet are sequentially communicated; the mixing chamber also has a powder material inlet, the powder material inlet, the mixing chamber and the liquid outlet are sequentially communicated along a flow direction of powder material; the liquid outlet is connected with a filter device.

9 Claims, 6 Drawing Sheets

(51) Int. Cl.

| | |
|---|---|
| ***B01F 23/70*** | (2022.01) |
| ***B01F 27/072*** | (2022.01) |

(56) References Cited

FOREIGN PATENT DOCUMENTS

| | | | | | | |
|---|---|---|---|---|---|---|
| CN | 210993907 | U | | 7/2020 | | |
| CN | 111991863 | A | * | 11/2020 | .......... | B01F 25/4111 |
| CN | 113426353 | A | | 9/2021 | | |
| CN | 113499698 | A | * | 10/2021 | | |
| CN | 217042142 | U | | 7/2022 | | |
| CN | 218307353 | U | | 1/2023 | | |
| DE | 3543270 | A1 | * | 6/1986 | | |
| KR | 101405108 | B1 | * | 6/2014 | .............. | B01F 35/90 |
| SU | 1494956 | A1 | * | 7/1989 | ............ | B01F 25/451 |
| WO | 2007115531 | A1 | | 10/2007 | | |

OTHER PUBLICATIONS

English translate (CN111991863A), retrieved date Oct. 23, 2025.*
English translate (SU1494956A1), retrieved date Oct. 23, 2025.*
English translate (KR101405108B1), retrieved date Oct. 23, 2025.*
English translate (DE3543270A1), retrieved date Oct. 23, 2025.*
Extended European Search Report issued in counterpart European Patent Application No. 23790528.6, dated Apr. 28, 2025.
International Search Report and Written Opinion issued in corresponding PCT Application No. PCT/CN2023/077010, dated Jun. 13, 2023.

* cited by examiner

PULPING MACHINE

CROSS-REFERENCE TO RELATED APPLICATIONS

This application is a continuation application of International Application No. PCT/CN2023/077010, filed on Feb. 18, 2023, which claims priority to Chinese Patent Application No. 202222162200.X, filed on Aug. 16, 2022. The disclosures of the above-mentioned applications are incorporated herein by reference in their entireties.

TECHNICAL FIELD

The present application relates to the technical field of mixing equipment, in particular to a pulping machine.

BACKGROUND

At present, with the development of powder technology, more and more ultrafine powders need to be dispersed into a small amount of liquid (liquid is solvent) to form a slurry with high solid content and high viscosity. However, it is difficult to mix the slurry with high solid content and high viscosity evenly, so it is necessary to fully disperse and grind them by equipment to improve the physical properties of the slurry.

The work of the pulping machine is mainly divided into mixture in the early stage and dispersion (also that is, grind or called shear) in the later stage. A powder-liquid mixing machine disclosed in the patent document with the patent publication number CN113499698A, it comprises a mixing chamber and a dispersing chamber, the flow direction of the slurry cyclically is: mixing chamber (that is, stirring chamber) to mixing material outlet to liquid storage tank (that is, solvent tank) to liquid inlet to dispersing chamber to mixing chamber.

However, powder materials based on pulping machine may contain hard impurities (such as screws), thereby may cause damage to the dispersing device (or called grinding device, shearing device) of the pulping machine.

SUMMARY

In order to overcome the deficiencies of the prior art, the purpose of the present application is to provide a pulping machine, it has a protective function to prevent hard impurities (such as screws) from causing damage to the dispersing device (or called grinding device) of the pulping machine.

The purpose of the present application is realized through the following technical solutions.

The present application provides a pulping machine, including a frame, a mixing device, and a dispersing device. The frame is provided with a mixing chamber and a dispersing chamber, the mixing device is accommodated in the mixing chamber, the dispersing device is accommodated in the dispersing chamber; the dispersing chamber is provided with a liquid inlet, the mixing chamber is provided with a liquid outlet and a powder material inlet, the liquid inlet, the dispersing chamber, the mixing chamber and the liquid outlet are sequentially communicated; the powder material inlet, the mixing chamber and the liquid outlet are sequentially communicated along a flow direction of powder material; the liquid outlet is connected with a filter device.

In an embodiment, the filtering device includes a first pipeline and a second pipeline, the first pipeline is connected to the liquid outlet, the second pipeline is located below the first pipeline, a top of the second pipeline is configured to communicate with a bottom wall of the first pipeline, the first pipeline is configured to connect a liquid storage tank, and a bottom of the second pipeline is provided with a blocking structure.

In an embodiment, the blocking structure is detachably connected to the second pipeline.

In an embodiment, the frame is also provided with a cooling chamber, the cooling chamber is configured to warp around a periphery of the dispersing chamber and is isolated from the dispersing chamber.

In an embodiment, an inlet of the cooling chamber is located at a bottom of the cooling chamber, and an outlet of the cooling chamber is located at a top of the cooling chamber.

In an embodiment, the pulping machine further includes an internal circulation flushing pipeline, where the internal circulation flushing pipeline is connected with a flushing valve and a power water pump, an inlet of the internal circulation flushing pipeline is configured to communicate with the mixing chamber, and an outlet of the internal circulation flushing pipeline is configured to face the mixing device.

In an embodiment, the mixing device includes a centrifugal impeller, the centrifugal impeller is pivotally connected to the frame through a rotating shaft; an impeller body of the centrifugal impeller is provided with a plurality of upper blades, the plurality of the upper blades are spaced apart around a circumferential direction of the impeller body; the impeller body of the centrifugal impeller is also connected with a plurality of lower blades, a plurality of the lower blades are located directly below the impeller body and spaced apart around the circumferential direction of the impeller body; the lower blade extends to an edge of a bottom of the impeller body along a radial direction of the impeller body from inside to outside; the lower blade is provided with a plurality of turbulent flow through holes;

- the bottom of each upper blade is connected with a bottom of one of the lower blades, and the bottom of the upper blade continues to extend along the radial direction of the impeller body from the edge of the bottom of the impeller body to form a protrusion, an outermost end of the lower blade extends to directly below the protrusions, so that a stirring zone is formed between two adjacent protrusions;
- the plurality of the turbulent flow through holes of the lower blade are located on a horizontal side of the stirring zone;
- the upper blade is a monolithic structure and extends downward spirally and obliquely along the circumferential direction of the impeller body;
- the mixing device also includes a dispersing centrifugal wheel body provided with a plurality of cutting rods, the plurality of cutting rods are spaced apart on a side wall of the dispersing centrifugal wheel body; the dispersing centrifugal wheel body is connected to a top of the impeller body;
- the dispersing centrifugal wheel body is detachably connected to the impeller body; a side wall of the cutting rod has a plurality of sharp edges;
- the dispersing centrifugal wheel body is arranged in a pyramidal structure, and a cross-sectional outer profile of the dispersing centrifugal wheel body gradually becomes larger from top to bottom; the plurality of the cutting rods extend downwards spirally and at intervals along a circumferential direction of the dispersing centrifugal wheel body to form a dispersing unit combination, and a plurality of the dispersing unit combinations are distributed at intervals around the circumferential direction of the dispersing centrifugal wheel body.

In an embodiment, the dispersing device includes a grinding stator and a grinding rotor; both the grinding stator and the grinding rotor are disc-shaped structure, the grinding stator and the grinding rotor are arranged coaxially and stackedly; the grinding stator is provided with a plurality of first axial through holes, the plurality of the first axial through holes are spaced apart from each other; the grinding rotor is provided with a plurality of second axial through holes, the plurality of the second axial through holes are spaced apart from each other; when the grinding rotor rotates relative to the grinding stator, at least part of the first axial through holes can communicate with at least part of the second axial through holes.

An end surface of the grinding stator facing the grinding rotor is provided with a first spoiler component including a plurality of first spoiler units, the plurality of the first spoiler units are spaced apart from each other;

an end surface of the grinding rotor facing the grinding stator is provided with a second spoiler component including a plurality of second spoiler units, the plurality of the second spoiler units are spaced apart from each other.

In an embodiment, the first spoiler unit is a groove structure; the first spoiler unit has a strip-shaped structure and extends from a radial direction of the grinding stator from inside to outside; the second spoiler unit is a groove structure; the second spoiler unit has a strip-shaped structure and extends from the radial direction of the grinding rotor from inside to outside;

the grinding stator and the grinding rotor are spaced apart to form a slurry circulation gap between the grinding stator and the grinding rotor.

Compared with the prior art, the beneficial effects of the present application are: based on that after the powder material is mixed with the liquid (that is, solvent) in the mixing chamber, it needs to pass through the filter device first, and then passes through the dispersing device in the dispersing chamber, so that the hard impurities (such as screws) mixed in the powder material have been filtered out by the filter device, thereby the hard impurities (such as screws) will not cause damage to the dispersing device, that is, the protective ability of the pulping machine is improved.

DETAILED DESCRIPTION OF THE EMBODIMENTS

The present application is further described below in conjunction with the accompanying drawings and specific implementation methods, it should be noted that, on the premise of no conflict, the various embodiments or the various technical features described below can be combined arbitrarily to form new embodiments.

It should be noted that when an element is referred to as being "fixed" to another element, it can be directly on another element, or there can also be an intervening element. When an element is referred to as being "connected to" another element, it can be directly connected to another element or there may be an intervening element. The terms "vertical", "horizontal", "left", "right" and similar expressions used herein are only for illustrative purposes only and not intended to be the only implementation methods.

Unless otherwise defined, all technical terms and scientific terms used herein have the same meanings as those commonly understood by a person skilled in the technical field of the present application. The terms used in the description of the present application herein are only for the purpose of describing specific embodiments, and are not intended to limit the present application. The term "and/or" used herein includes any and all combinations of one or more of the associated listed items.

Figure 1:
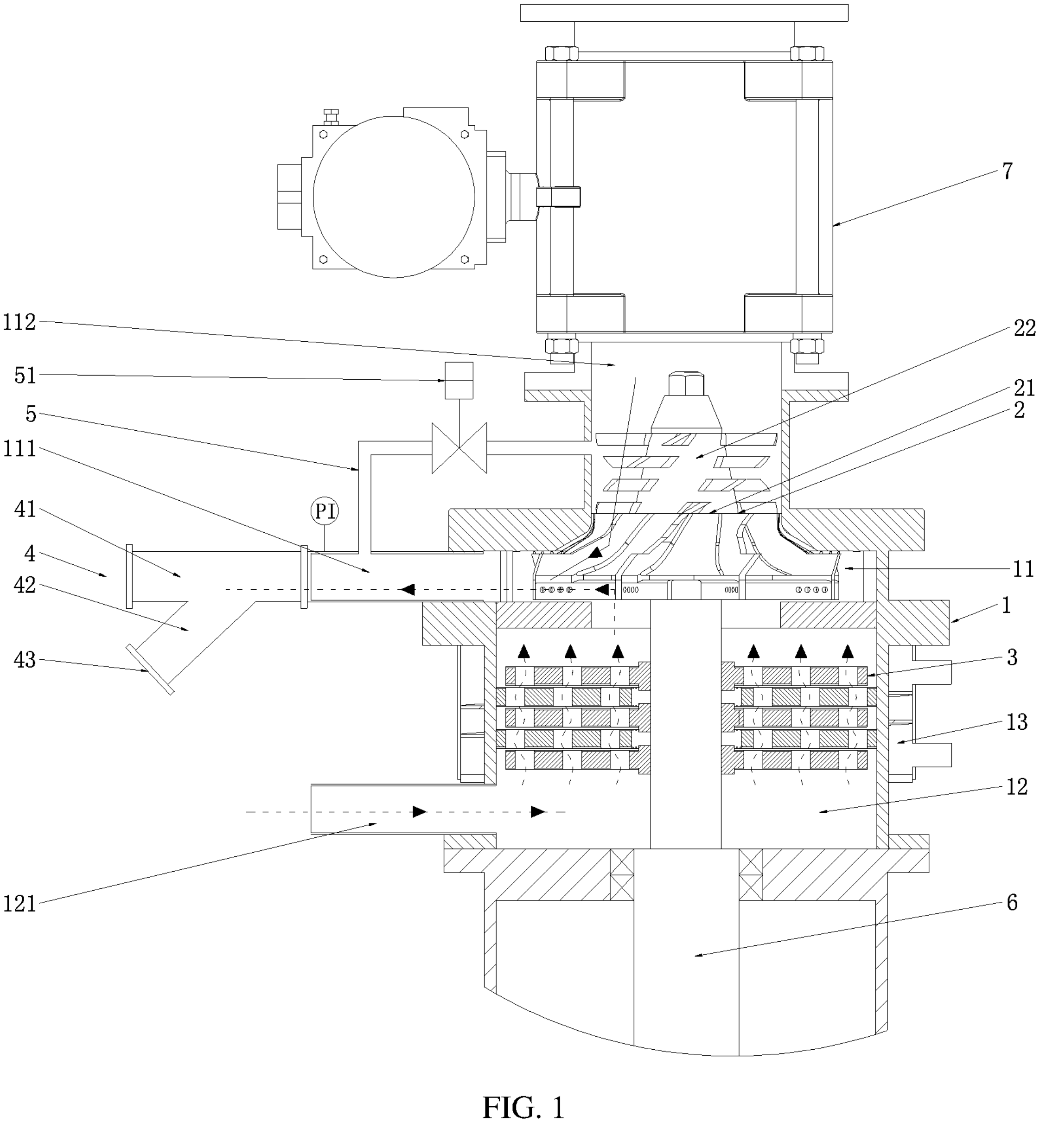
FIG. 1 is a structural schematic view of a pulping machine according to the present application; where an arrow with a solid line is the flow direction of the powder material, an arrow with a dotted line is the flow direction of the slurry.

FIG. 1 shows a pulping machine according to an embodiment of the present application. The pulping machine includes a frame 1, a mixing device 2 and a dispersing device 3. The frame 1 is provided with a mixing chamber 11 and a dispersing chamber 12, the mixing device 2 is accommodated in the mixing chamber 11, and the dispersing device 3 is accommodated in the dispersing chamber 12. The dispersing chamber 12 is provided with a liquid inlet 121, the mixing chamber 11 is provided with a liquid outlet 111 and a powder material inlet 112, the liquid inlet 121, the dispersing chamber 12, the mixing chamber 11 and the liquid outlet 111 are sequentially communicated, the powder material inlet 112, the mixing chamber 11 and the liquid outlet 111 are sequentially communicated along a flow direction of powder material. The liquid outlet 111 is connected with a filter device 4.

With this arrangement, slurry flow direction of this kind of pulping machine is: liquid storage tank to liquid inlet 121 to dispersing chamber 12 to mixing chamber 11 to liquid outlet 111 to filter device 4 to liquid storage tank. And the flow direction of hard impurities (such as screws) is: powder material inlet 112 to mixing chamber 11 to liquid outlet 111 to filter device 4. As the powder material is put into the mixing chamber 11 in small quantities for many times, and as the solid content of the slurry becomes higher and higher, the pulping machine will enter a dispersion stage from a mixing stage (that is, grinding stage or called shearing stage), in the dispersion stage, a feeding of powder materials will be stopped, and the slurry will be fully dispersed to improve the mixing degree of the slurry, that is, to improve the performance of the slurry. Specifically, the feeding of the powder material is controlled by a ball valve 7 on a top of the frame 1.

Obviously, based on that after the powder material is mixed with the liquid (that is, solvent) in the mixing chamber 11, it needs to pass through the filter device 4 first, and then pass through the dispersing device 3 in the dispersing chamber 12, so that the hard impurities (such as screws) mixed in the powder material have been filtered out by the filter device 4, thereby the hard impurities (such as screws) will not cause damage to the dispersing device 3, that is, the protective ability of the pulping machine is improved.

Referring to FIG. 1, in an embodiment, the filtering device 4 includes a first pipeline 41 and a second pipeline 42, the first pipeline 41 is connected to the liquid outlet 111, the second pipeline 42 is located below the first pipeline 41, a top of the second pipeline 42 is configured to communicate with a bottom wall of the first pipeline 41, the first pipeline 41 is configured to connect a liquid storage tank, and a bottom of the second pipeline 42 is provided with a blocking structure 43. With this arrangement, when hard impurities (such as screws) flow along the first pipeline 41 and enter directly above the second pipeline 42, they will fall to the second pipeline 42 because of influence of their own gravity, and, based on that fluidity of the slurry in the second pipeline 42 is relatively poor, thus hard impurities remain in the second pipeline 42 stably. It can be understood that the filter also can be a conventional mature filter.

In order to facilitate regular cleaning of hard impurities, the blocking structure 43 is detachably connected to the second pipeline 42.

Referring to FIG. 1, in an embodiment, based on that the dispersing device 3 will generate a large amount of heat in a process of dispersing the slurry, in order to prevent the slurry from being damaged due to high temperature, the frame 1 is also provided with a cooling chamber 13, the cooling chamber 13 is configured to warp around a periphery of the dispersing chamber 12 and is isolated from the dispersing chamber 12. In order to improve cooling effect, an inlet of the cooling chamber 13 is located at a bottom of the cooling chamber 13, and an outlet of the cooling chamber 13 is located at a top of the cooling chamber 13.

Referring to FIG. 1, in an embodiment, a pulping machine further includes an internal circulation flushing pipeline 5, where the internal circulation flushing pipeline 5 is connected with a flushing valve 51 and a power water pump, an inlet of the internal circulation flushing pipeline 5 is configured to communicate with the mixing chamber 11, and an outlet of the internal circulation flushing pipeline 5 is configured to face the mixing device 2. In this way, the slurry in the mixing chamber 11 is pumped to the mixing device 2 through the internal circulation flushing pipeline 5, so that the powder material remaining on the mixing device 2 is brought into the slurry.

Figure 2:
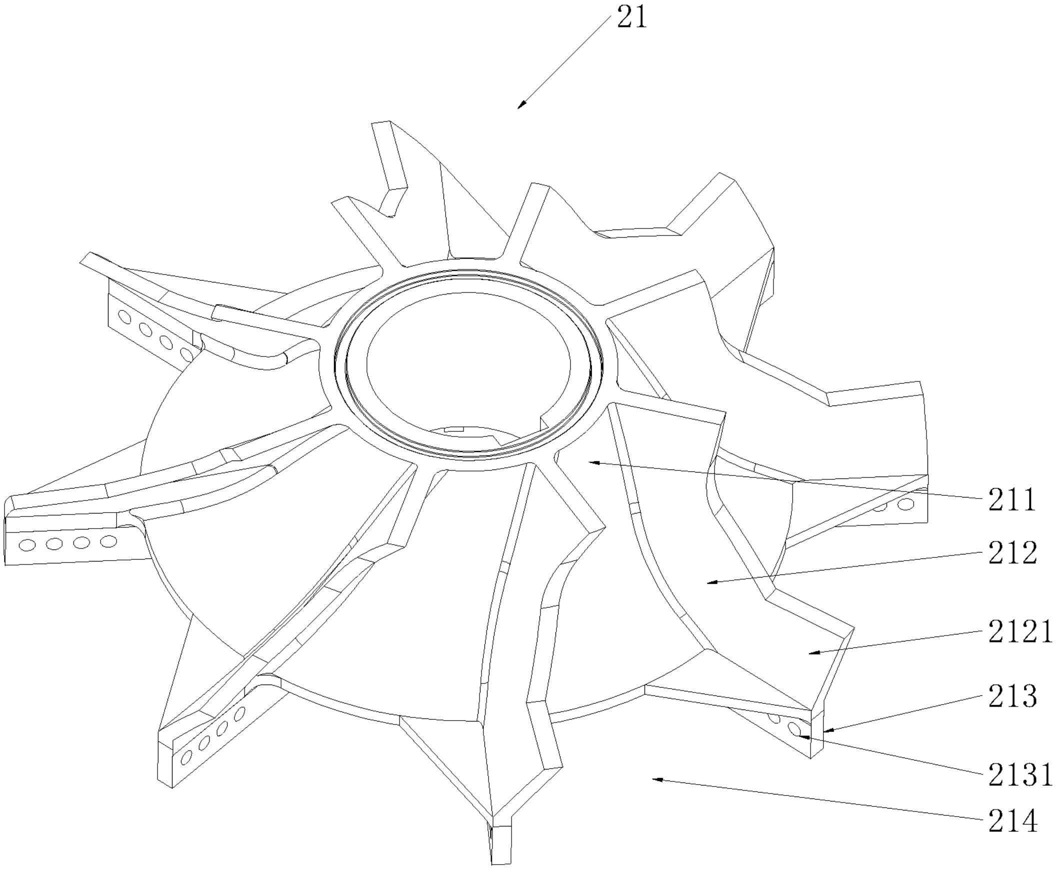
FIG. 2 is a structural schematic view of a centrifugal impeller of FIG. 1.
Figure 3:
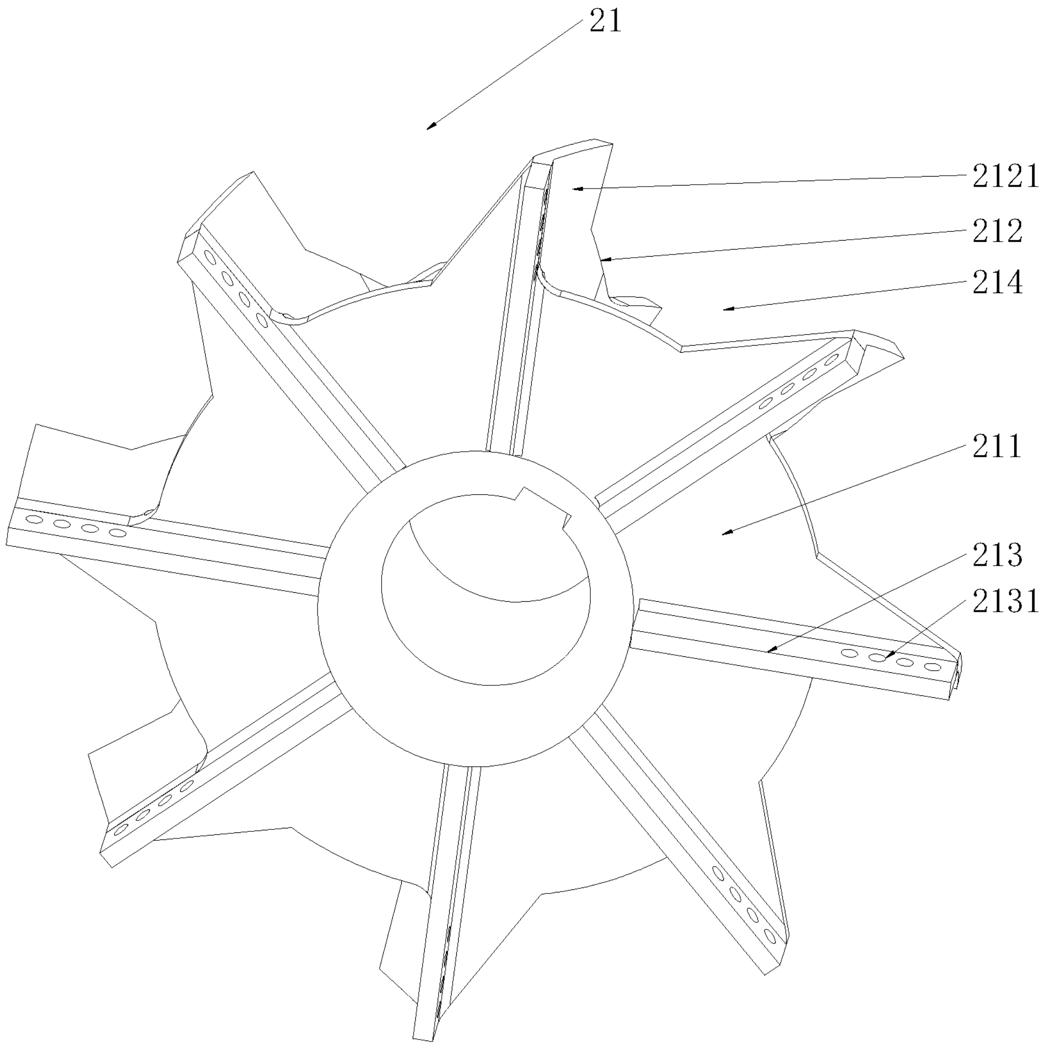
FIG. 3 is another perspective view of FIG. 2.

Referring to FIG. 1 to FIG. 3, in an embodiment, the mixing device 2 includes a centrifugal impeller 21, the centrifugal impeller 21 is pivotally connected to the frame 1 through a rotating shaft 6; an impeller body 211 of the centrifugal impeller 21 is provided with a plurality of upper blades 212, the plurality of upper blades 212 are spaced apart around a circumferential direction of the impeller body 211. The impeller body 211 of the centrifugal impeller 21 is also connected with a plurality of lower blades 213, the plurality of the lower blades 213 are located directly below the impeller body 211 and spaced apart around the circumferential direction of the impeller body 211. The lower blade 213 extends to an edge of a bottom of the impeller body 211 along a radial direction of the impeller body 211 from inside to outside. The lower blade 213 is provided with a plurality of turbulent flow through holes 2131. When working, the liquid solvent and the powder material meet and mix at the bottom of the impeller body 211 to form the slurry, so the slurry is stirred by the lower blade 213, and then the slurry is discharged radially by a centrifugal force of the movement itself, so that on the basis of ensuring strong stirring efficiency, it also takes into account a discharge capacity of the mixing device 2. Obviously, the powder is evenly distributed around the bottom of the impeller body 211 by the upper blades 212 so as to improve stirring efficiency of the lower blade 213 to the slurry. By designing the lower blade 213 to extend to the edge of the bottom of the impeller body 211 along the radial direction of the impeller body 211 from inside to outside, thus the stirring zone of the lower blade 213 is made larger, so as to ensure that it retains a certain stirring efficiency and emphatically improves its discharge capacity; then a stirring ability of the lower blade 213 is improved through the plurality of turbulence holes of the lower blade 213, thereby compensating for the decline of the stirring efficiency; in this way, it makes the mixing device 2 take into account a discharge capacity of the mixing device 2 on the basis of ensuring a strong stirring efficiency.

Referring to FIG. 2 and FIG. 3, in an embodiment, a bottom of each upper blade 212 is connected with a bottom of one of the lower blades 213, and the bottom of the upper blade 212 continues to extend along the radial direction of the impeller body 211 from the edge of the bottom of the impeller body 211 to form a protrusion 2121, an outermost end of the lower blade 213 extends to directly below the protrusions 2121, so that a stirring zone 214 is formed between two adjacent protrusions 2121. Obviously, based on the semi-closed stirring zone 214 that enclosed together by two adjacent lower blades 213 and two adjacent protrusions 2121, and based on a connection between the bottom of each upper blade 212 and the bottom of one of the lower blades 213, thereby further improving the discharge capacity of each lower blades 213, therefore, the forming of the stirring zone 214 not only improves the stirring efficiency, but also takes into account the discharge capacity of the centrifugal impeller 21.

In an embodiment, at this time, in order to maximize an effect of the turbulent flow hole, the plurality of the turbulent flow through holes 2131 of the lower blade 213 are located on a horizontal side of the stirring zone 214.

Referring to FIG. 2 and FIG. 3, in an embodiment, the upper blade 212 is a monolithic structure and extends downward spirally and obliquely along the circumferential direction of the impeller body 211; with this arrangement, a drainage area of the upper blade 212 is larger, so that it can make the powder material already located between two adjacent upper blades 212 escape to the place between the other two upper blades 212, thus the centrifugal impeller 21 can drain powder solids more evenly, so as to improve the stirring ability of the centrifugal impeller 21.

Figure 4:
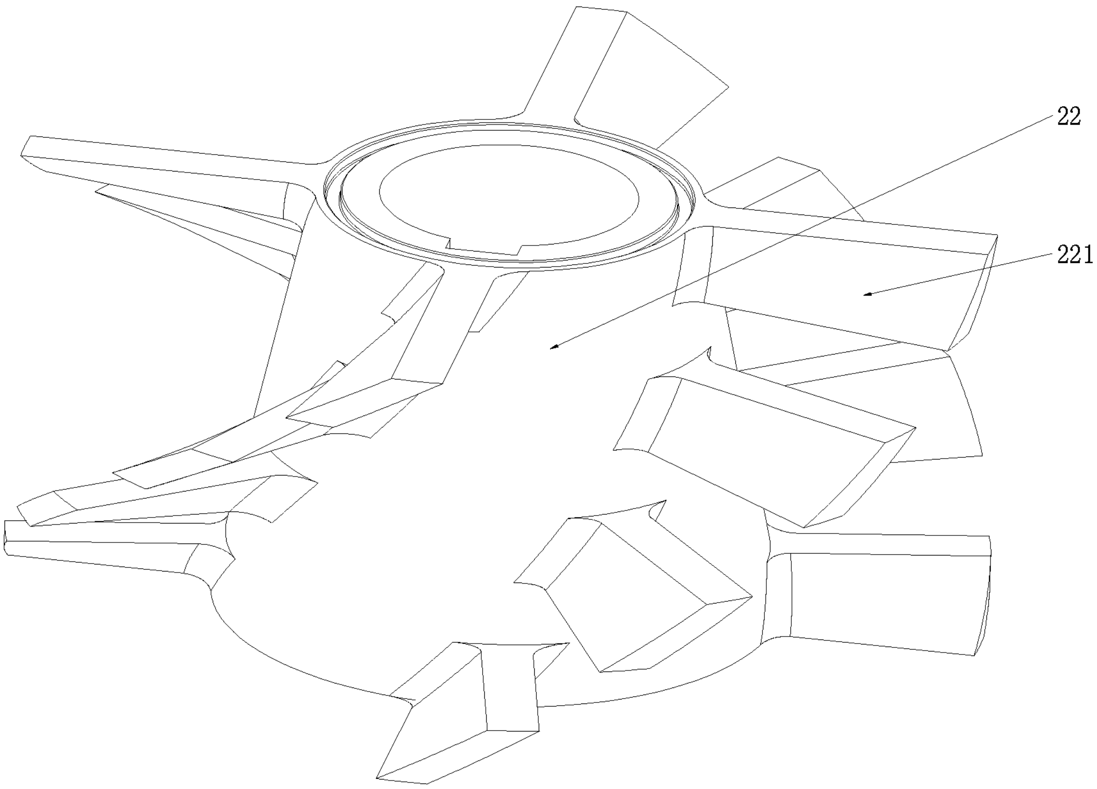
FIG. 4 is a structural schematic view of the connection of a dispersing centrifugal wheel body and a cutting rod of FIG. 1.

Referring to FIG. 4, in an embodiment, the mixing device 2 also includes a dispersing centrifugal wheel body 22 provided with a plurality of cutting rods 221, the plurality of the cutting rods 221 are spaced apart on a side wall of the dispersing centrifugal wheel body 22; the dispersing centrifugal wheel body 22 is connected to a top of the impeller body 211. With this arrangement, the powder material is dispersed more evenly with the dispersing centrifugal wheel body 22, so that the powder material is distributed around the bottom of the impeller body 211 more evenly.

Referring to FIG. 1, in an embodiment, in order to facilitate maintenance and reduce maintenance costs, the dispersing centrifugal wheel body 22 is detachably connected to the impeller body 211; with this arrangement, when one of the dispersing centrifugal wheel body 22 and the impeller body 211 needs to be replaced, the other can continue to be used. In order to make the cutting rod 221 have more sharp cutting places, a side wall of the cutting rod 221 has a plurality of sharp edges.

Referring to FIG. 4, in an embodiment, the dispersing centrifugal wheel body 22 is arranged in a pyramidal structure, and a cross-sectional outer profile of the dispersing centrifugal wheel body 22 gradually becomes larger from top to bottom; the plurality of the cutting rods 221 extend downwards spirally and at intervals along a circumferential direction of the dispersing centrifugal wheel body 22 to form a dispersing unit combination, and a plurality of the dispersing unit combinations are distributed at intervals around the circumferential direction of the dispersing centrifugal wheel body 22. With this arrangement, when looking down at the dispersing centrifugal wheel body 22, the cutting rods 221 distributed along the circumferential direction of the dispersing centrifugal wheel body 22 are more dense, so that the powder material basically will not pass through directly without being cut by the cutting rods 221 during falling process, thereby ensuring that the agglomerated materials in the powder material are reliably broken up.

Figure 5:
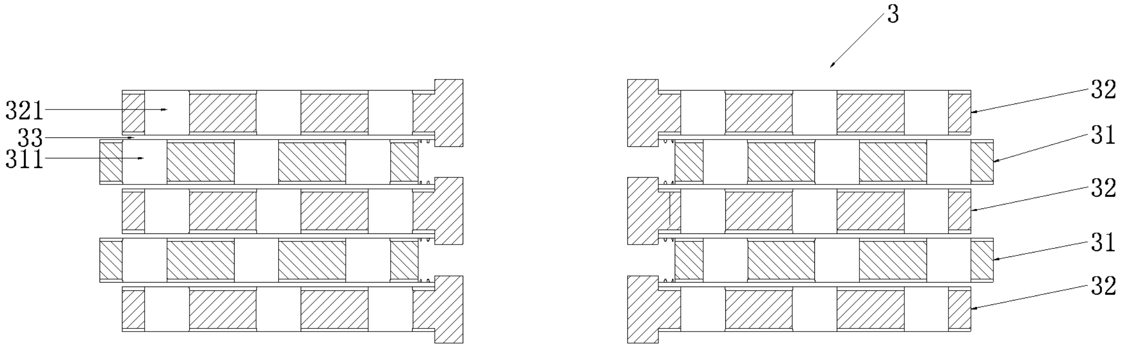
FIG. 5 is a structural schematic view of a dispersing device of FIG. 1.

Referring to FIG. 5, in an embodiment, the dispersing device 3 includes a grinding stator 31 and a grinding rotor 32; both the grinding stator 31 and the grinding rotor 32 are disc-shaped structure, the grinding stator 31 and the grinding rotor 32 are arranged coaxially and stackedly; the grinding stator 31 is provided with a plurality of first axial through holes 311, the plurality of the first axial through holes 311 are spaced apart from each other; the grinding rotor 32 is provided with a plurality of second axial through holes 321, the plurality of the second axial through holes 321 are spaced apart from each other; when the grinding rotor 32 rotates relative to the grinding stator 31, at least part of the first axial through holes 311 communicate with at least part of the second axial through holes 321. That is to say, at least part of the first axial through holes 311 and at least part of the second axial through holes 321 may be in a state of constant communication, or may be communicated to each other only when the first axial through holes 311 and the second axial through holes 321 at least partially overlap; and a essential requirement is that as long as at least part of the first axial through holes 311 and at least part of the second axial through holes 321 can remain communicated during a rotation of the grinding rotor 32 relative to the grinding stator 31, thereby allowing the slurry to penetrate the first grinding assembly, and then to be sheared by the grinding stator 31 and the grinding rotor 32, so as to improve mixing degree and fluidity of the slurry, that is, to improve performance of the slurry as a purpose. Obviously, by arranging both the grinding stator 31 and the grinding rotor 32 as disc-shaped structure, thereby enabling the grinding stator 31 and the grinding rotor 32 to be arranged coaxially and stackedly so that the grinding stator 31 and the grinding rotor 32 are capable of shearing the slurry to improve performance of the slurry. Moreover, based on that the first axial through hole 311 and the second axial through hole 321 are both used for allowing the slurry to pass through, so that most of the slurry must pass through the shearing point between the stator and the rotor, thus ensuring that the slurry can be sheared reliably to improve dispersion effect and grinding effect of the slurry. In addition, based on that when the grinding rotor 32 rotates relative to the grinding stator 31, at least part of the first axial through holes 311 can communicate with at least part of the second axial through holes 321 to ensure continuous liquidity of the slurry. In addition, based on that the grinding stator 31 and the grinding rotor 32 are arranged stackedly, that is, the dispersion volume between the grinding stator 31 and the grinding rotor 32 is greatly increased, thereby greatly improving the production efficiency of the pulping machine. Obviously, the dispersing device 3 also can be other structures in the prior art.

Figure 6:
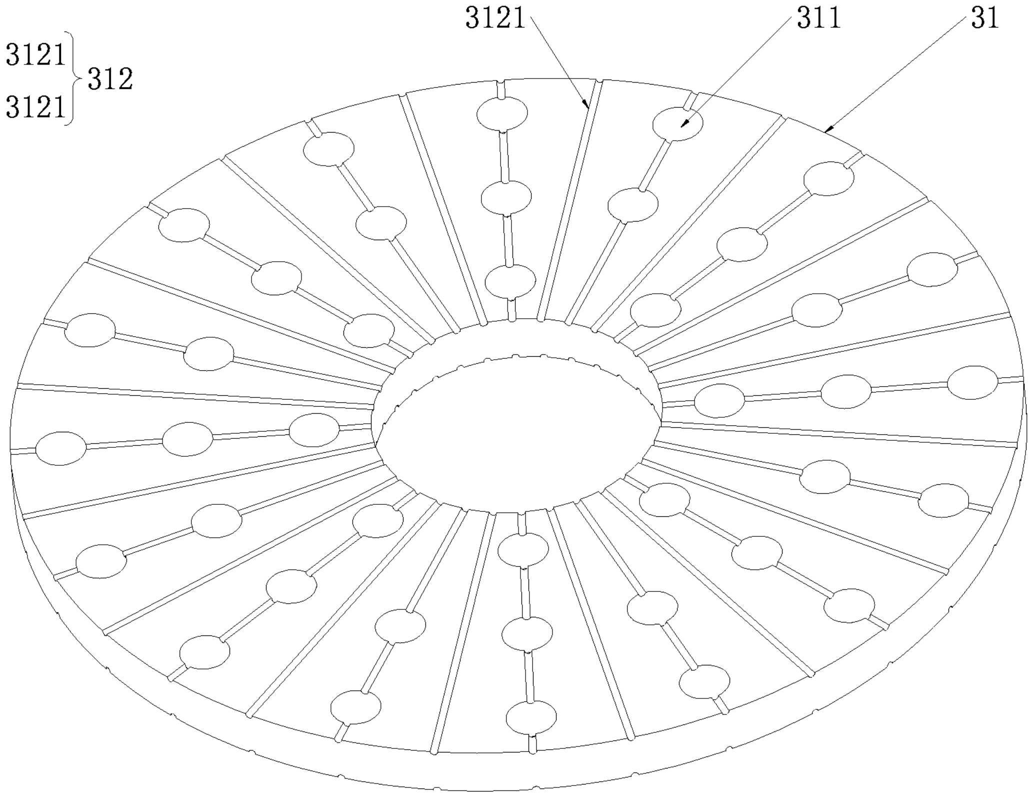
FIG. 6 is a structural schematic view of a grinding stator of FIG. 5.
Figure 7:
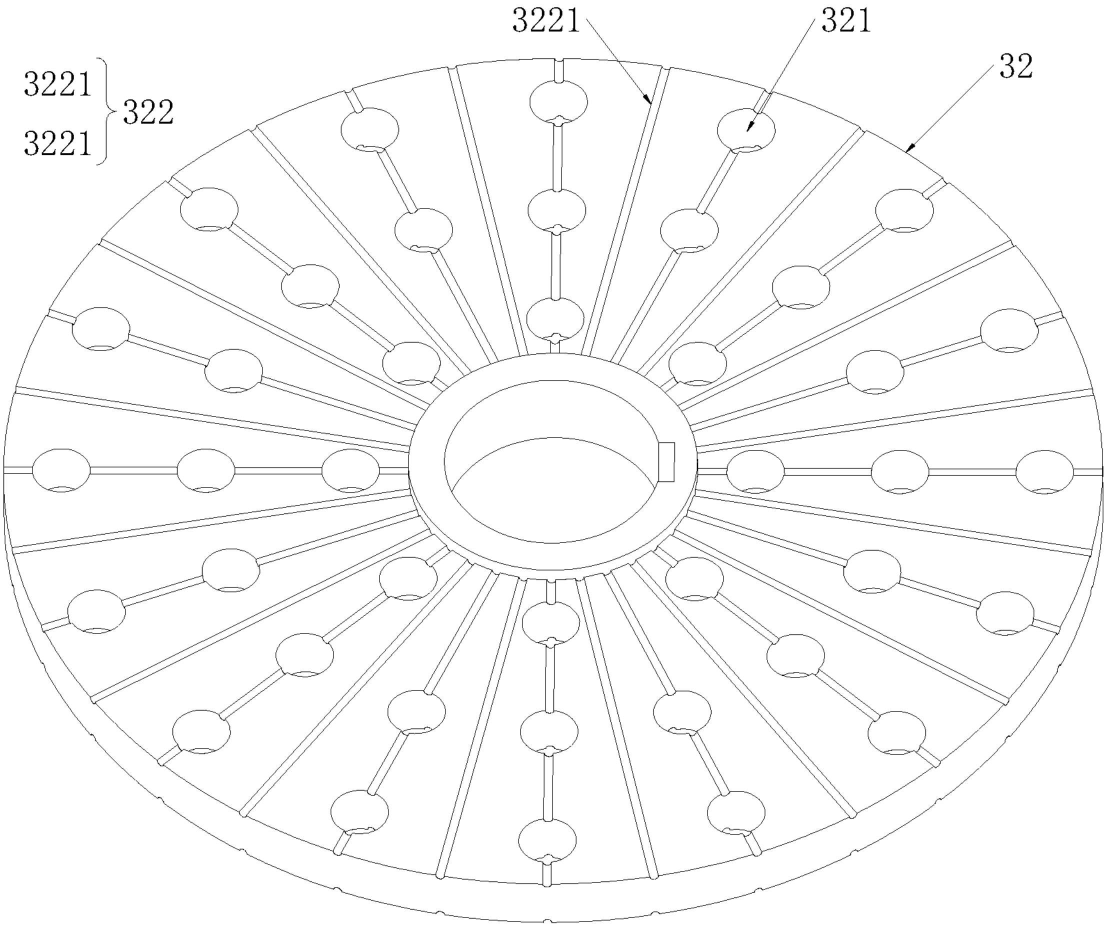
FIG. 7 is a schematic structural view of a grinding rotor of FIG. 5.

In an embodiment, referring to FIG. 6 and FIG. 7, an end surface of the grinding stator 31 facing the grinding rotor 32 is provided with a first spoiler component 322 including a plurality of first spoiler units 3221, the plurality of the first spoiler units 3221 are spaced apart from each other. With this arrangement, a turbulent degree of the slurry is further improved through the first spoiler component 322, which makes the slurry stay in the dispersing device 3 for a slightly longer time, thereby further improving shearing effect to further improve the performance of the slurry. In the same way, the end surface of the grinding rotor 32 facing the grinding stator 31 is provided with a second spoiler component 312, the second spoiler component 312 includes a plurality of second spoiler units 3121, the plurality of the second spoiler units 3121 are spaced apart with each other.

In an embodiment, in order to improve precision of grinding, and without being forced to increase a distance between the grinding stator 31 and the grinding rotor 32, the first spoiler unit 3221 is a groove structure; that is to say, if the first spoiler unit 3221 is a protruding structure, it is necessary to increase the distance between the grinding stator 31 and the grinding rotor 32 as a prerequisite. In an embodiment, in order to enable the first spoiler unit 3221 to spoil the flow over a large area, the first spoiler unit 3221 has a strip-shaped structure and extends from the a radial direction of the grinding stator 31 from inside to outside. In the same way, the second spoiler unit 3121 is a groove structure; the second spoiler unit 3121 has a strip-shaped structure and extends from the radial direction of the grinding rotor 32 from inside to outside.

In an embodiment, the grinding stator 31 and the grinding rotor 32 are spaced apart to form a slurry circulation gap 33 between the grinding stator 31 and the grinding rotor 32. With this arrangement, the first axial through hole 311 and the second axial through hole 321 are in a state of continuous communication to ensure the fluidity of the slurry.

The above-mentioned embodiments are only some embodiments of the present application, and cannot be used to limit the protection scope of the present application. Any non-substantive changes and substitutions made by those skilled in the art on the basis of the present application should fall within the scope of the present application.

What is claimed is:

1. A pulping machine, comprising:

a frame provided with a mixing chamber and a dispersing chamber;

a mixing device accommodated in the mixing chamber; and a dispersing device accommodated in the dispersing chamber, wherein the dispersing chamber is provided with a liquid inlet, the mixing chamber is provided with a liquid outlet and a powder material inlet, the liquid inlet, the dispersing chamber, the mixing chamber and the liquid outlet are sequentially communicated; the powder material inlet, the mixing chamber and the liquid outlet are sequentially communicated along a flow direction of powder material; the liquid outlet is connected with a filter device;

wherein the mixing device comprises a centrifugal impeller, the centrifugal impeller is pivotally connected to the frame through a rotating shaft; an impeller body of the centrifugal impeller is provided with a plurality of upper blades, the plurality of the upper blades are spaced apart around a circumferential direction of the impeller body; the impeller body of the centrifugal impeller is connected with a plurality of lower blades, the plurality of the lower blades are located directly below the impeller body and spaced apart around the circumferential direction of the impeller body; the lower blade extends to an edge of a bottom of the impeller body along a radial direction of the impeller body from inside to outside; the lower blade is provided with a plurality of turbulent flow through holes;

a bottom of each upper blade is connected with a bottom of one of the lower blades, and the bottom of the upper blade continues to extend along the radial direction of the impeller body from the edge of the bottom of the impeller body to form a protrusion, an outermost end of the lower blade extends to directly below the protrusions, so that a stirring zone is formed between two adjacent protrusions;

the plurality of the turbulent flow through holes of the lower blade are located on a horizontal side of the stirring zone;

the upper blade is a monolithic structure and extends downward spirally and obliquely along the circumferential direction of the impeller body;

the mixing device comprises a dispersing centrifugal wheel body provided with a plurality of cutting rods, the plurality of cutting rods are spaced apart on a side wall of the dispersing centrifugal wheel body; the dispersing centrifugal wheel body is connected to a top of the impeller body;

the dispersing centrifugal wheel body is detachably connected to the impeller body; a side wall of the cutting rod has a plurality of sharp edges;

the dispersing centrifugal wheel body is arranged in a pyramidal structure, and a cross-sectional outer profile of the dispersing centrifugal wheel body gradually becomes larger from top to bottom;

the plurality of the cutting rods extend downwards spirally and at intervals along a circumferential direction of the dispersing centrifugal wheel body to form a dispersing unit combination, and a plurality of the dispersing unit combinations are distributed at intervals around the circumferential direction of the dispersing centrifugal wheel body.

2. The pulping machine according to claim 1, wherein the filtering device comprises a first pipeline and a second pipeline, the first pipeline is connected to the liquid outlet, the second pipeline is located below the first pipeline, a top of the second pipeline is configured to communicate with a bottom wall of the first pipeline, the first pipeline is configured to connect to a liquid storage tank, and a bottom of the second pipeline is provided with a blocking structure.

3. The pulping machine according to claim 2, wherein the blocking structure is detachably connected to the second pipeline.

4. The pulping machine according to claim 1, wherein the frame is alse provided with a cooling chamber, the cooling chamber is configured to warp around a periphery of the dispersing chamber and is isolated from the dispersing chamber.

5. The pulping machine according to claim 4, wherein an inlet of the cooling chamber is located at a bottom of the cooling chamber, and an outlet of the cooling chamber is located at a top of the cooling chamber.

6. The pulping machine according to claim 1, further comprising:

an internal circulation flushing pipeline, wherein the internal circulation flushing pipeline is connected with a flushing valve and a power water pump, an inlet of the internal circulation flushing pipeline is configured to communicate with the mixing chamber, and an outlet of the internal circulation flushing pipeline is configured to face the mixing device.

7. The pulping machine according to claim 1, wherein the dispersing device comprises a grinding stator and a grinding rotor; both the grinding stator and the grinding rotor are disc-shaped structure, the grinding stator and the grinding rotor are arranged coaxially and stackedly; the grinding stator is provided with a plurality of first axial through holes, the plurality of first axial through holes are spaced apart from each other; the grinding rotor is provided with a plurality of second axial through holes, the plurality of second axial through holes are spaced apart from each other; when the grinding rotor rotates relative to the grinding stator, at least part of the first axial through holes communicate with at least part of the second axial through holes.

8. The pulping machine according to claim 7, wherein an end surface of the grinding stator facing the grinding rotor is provided with a first spoiler component comprising a plurality of first spoiler units, the plurality of first spoiler units are spaced apart from each other;

an end surface of the grinding rotor facing the grinding stator is provided with a second spoiler component comprising a plurality of second spoiler units, the plurality of the second spoiler units are spaced apart from each other.

9. The pulping machine according to claim 8, wherein the first spoiler unit is a groove structure; the first spoiler unit has a strip-shaped structure and extends from a radial direction of the grinding stator from inside to outside; the second spoiler unit is a groove structure; the second spoiler unit has a strip-shaped structure and extends from the radial direction of the grinding rotor from inside to outside;

the grinding stator and the grinding rotor are spaced apart to form a slurry circulation gap between the grinding stator and the grinding rotor.

* * * * *